US012420617B2

(12) United States Patent
Yamamoto et al.

(10) Patent No.: US 12,420,617 B2
(45) Date of Patent: Sep. 23, 2025

(54) WIRE REGULATOR

(71) Applicants: AISIN CORPORATION, Kariya (JP); TOYOTA JIDOSHA KABUSHIKI KAISHA, Toyota (JP)

(72) Inventors: Kenji Yamamoto, Fujisawa (JP); Kenichi Suzuki, Fujisawa (JP); Kazuya Yokoyama, Fujisawa (JP); Takashi Sagisaka, Toyota (JP); Toshihiro Gotou, Toyota (JP); Kenji Kaneko, Toyota (JP)

(73) Assignees: AISIN CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 377 days.

(21) Appl. No.: 17/907,365

(22) PCT Filed: Mar. 5, 2021

(86) PCT No.: PCT/JP2021/008720
§ 371 (c)(1),
(2) Date: Sep. 26, 2022

(87) PCT Pub. No.: WO2021/199909
PCT Pub. Date: Oct. 7, 2021

(65) Prior Publication Data
US 2023/0125051 A1 Apr. 20, 2023

(30) Foreign Application Priority Data

Mar. 30, 2020 (JP) ................................. 2020-060546

(51) Int. Cl.
B60J 1/17 (2006.01)
B60J 1/20 (2006.01)
E05F 11/48 (2006.01)

(52) U.S. Cl.
CPC . *B60J 1/17* (2013.01); *B60J 1/20* (2013.01); *E05F 11/483* (2013.01); *E05Y 2800/428* (2013.01)

(58) Field of Classification Search
USPC .................... 49/360–363, 348–352, 374, 375
See application file for complete search history.

(56) References Cited

U.S. PATENT DOCUMENTS 7,555,868 B2* 7/2009 Tenorio ................. E05F 11/382
49/374
11,884,140 B2* 1/2024 Takaoka ................ E05F 11/385

FOREIGN PATENT DOCUMENTS

CN 209353945 U 9/2019
JP 2017-048529 A 3/2017
(Continued)

OTHER PUBLICATIONS

International Search Report in PCT/JP2021/008720 mailed Apr. 20, 2021 (2 pages).

*Primary Examiner* — Marcus Menezes
(74) *Attorney, Agent, or Firm* — Finnegan, Henderson, Farabow. Garrett and Dunner, LLP

(57) ABSTRACT

A task is to provide a wire regulator that can prevent a wire and a guide rail from rusting and prevent an operation failure of the wire regulator. A first rain water guide part 170 that prevents rain water from entering an ascending wire end housing part 157, a descending wire end housing part 163 and a gutter part 161 is provided at a part above a lower end of the ascending wire end housing part 157 of a slider 103, and the first rain water guide part 170 includes first eaves 171, and second eaves 173 that overlap the first eaves 171 on a lower side of the first eaves 171 and in a drop direction R of the rain water.

2 Claims, 7 Drawing Sheets

(56) References Cited

FOREIGN PATENT DOCUMENTS

JP 6523962 B 6/2019
WO WO 2015/064266 A1 5/2015

\* cited by examiner

WIRE REGULATOR

TECHNICAL FIELD

The present invention relates to a wire regulator that includes a guide rail that is provided along an ascending/descending direction of a window glass, a slider that is attached with the window glass and engages movably with the guide rail, an ascending wire whose one end is engaged with an ascending wire end housing part of the slider, and that extends toward an upper side of the slider, and a descending wire whose one end is engaged with a descending wire end housing part of the slider, and that extends toward a lower side of the slider, and that ascends or descends the slider along the guide rail by moving the ascending wire and the descending wire along the guide rail.

BACKGROUND ART

Generally, a regulator that opens and closes a window glass of a vehicle is provided in a space between an inner panel and an outer panel of a door.

Regulators include a wire regulator that includes a guide rail that is provided along an ascending/descending direction of a window glass, a slider that is attached with the window glass and engages movably with the guide rail, an ascending wire whose one end is engaged with a wire end housing part of the slider, and that is urged in a direction to pull a wire and extends toward an upper side of the slider, a descending wire whose one end is engaged with a wire end housing part of the slider, and that is urged in the direction to pull the wire and extends toward a lower side of the slider, and a driving section that drives a drum around which the ascending wire and the descending wire are wound, and that ascends or descends the slider along the guide rail by feeding or winding from the drum the descending wire and the ascending wire with the driving section wound around the drum.

According to this wire regulator, there is a case where rain water entering inside the door running on a window glass flows downward running on the guide rail, the slider or the descending wire, and thereby rusts the guide rail or the descending wire.

To prevent this rust, there is a regulator that includes a slider provided with eaves (rain gutter) that guide rain water having entered inside the door to such a position that the rain water does not run to the guide rail or the descending wire (see Patent Literature 1).

CITATION LIST

Patent Literature

Patent Literature 1: JP 6523962 B2

SUMMARY OF INVENTION

Technical Problem

However, there is a case where part of rain water having hit an upper surface of the eaves goes around to a lower surface of the eaves from an end of the eaves due to a surface tension, and drops.

When the dropped water enters the wire end housing part, the water freezes at a time of a low temperature, and causes an operation failure of the wire regulator. Furthermore, when the dropped water adheres to the wire or the guide rail, the water rusts the wire or the guide rail, and causes an operation failure of the wire regulator.

The present invention has been made in view of the above problem, and tasks of the present invention are to provide a wire regulator that can prevent an operation failure of the wire regulator.

Solution to Problem

To realize at least one of the above tasks, a wire regulator that reflects one aspect of the present invention includes: a guide rail that is provided along an ascending/descending direction of a window glass; a slider that is attached with the window glass and engages movably with the guide rail; an ascending wire whose one end is engaged with an ascending wire end housing part of the slider, and that extends toward an upper side of the slider; and a descending wire whose one end is engaged with a descending wire end housing part of the slider, and that extends toward a lower side of the slider, and ascends or descends the slider along the guide rail by moving the ascending wire and the descending wire along the guide rail, a first rain water guide part is provided at a part above a lower end of the ascending wire end housing part of the slider, the first rain water guide part preventing rain water from entering the ascending wire end housing part, the descending wire end housing part and a gutter part, and the first rain water guide part includes first eaves, and second eaves that overlap the first eaves on a lower side of the first eaves and in a drop direction of the rain water.

Other features of the present invention will be made more apparent from the embodiment and the accompanying drawings for carrying out the invention described below.

Advantageous Effects of Invention

According to the wire regulator according to the present invention, the first rain water guide part includes first eaves, and second eaves that overlap the first eaves on a lower side of the first eaves and in a drop direction of the rain water, so that, even when part of the rain water having hit the upper surface of the first eaves goes around to the lower surface of the first eaves due to a surface tension, and drops, the part of the rain water drops on an upper surface of the second eaves, and consequently do not enter the ascending wire end housing part or adhere to the wire or the guide rail. Consequently, the ascending wire end housing part does not freeze, the wire and the guide rail do not rust, and the wire regulator does not cause an operation failure.

Other effects of the present invention will be made more apparent from the embodiment and the accompanying drawings to carry out the invention described below.

DESCRIPTION OF EMBODIMENTS

Figure 4:
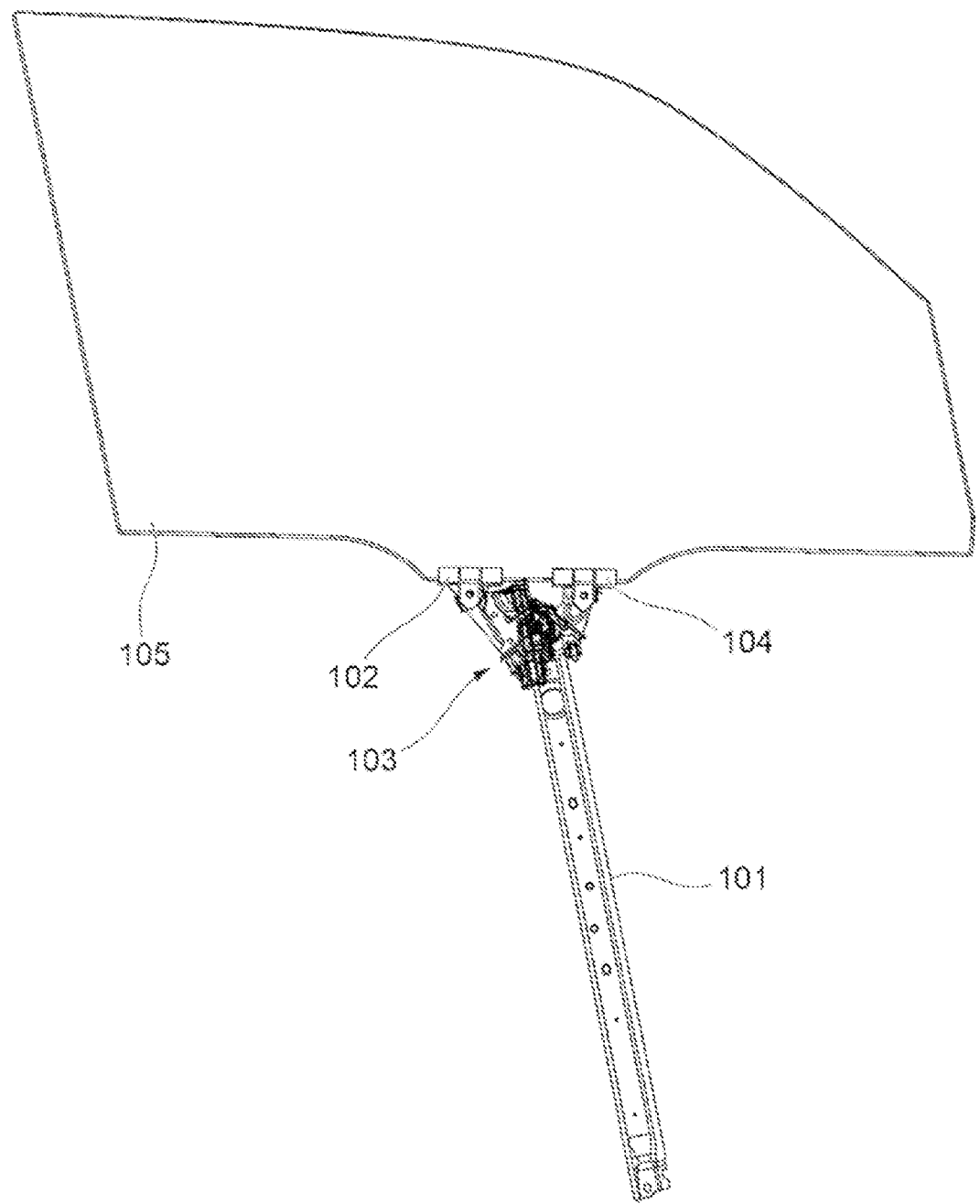
FIG. 4 is a front view of main parts of the wire regulator according to an embodiment.
Figure 5:
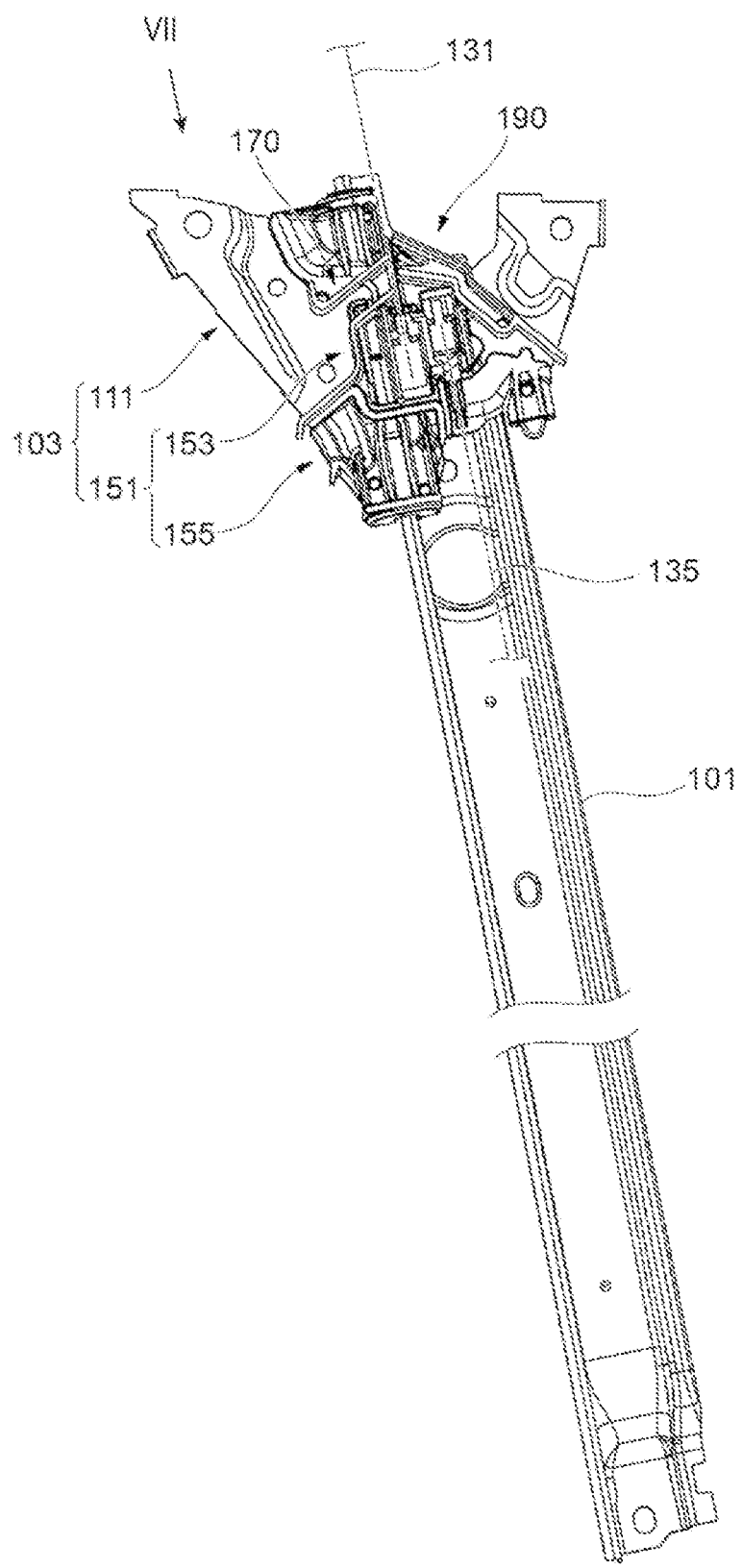
FIG. 5 is an enlarged view of a state where a glass and a bracket in FIG. 4 are removed.
Figure 6:
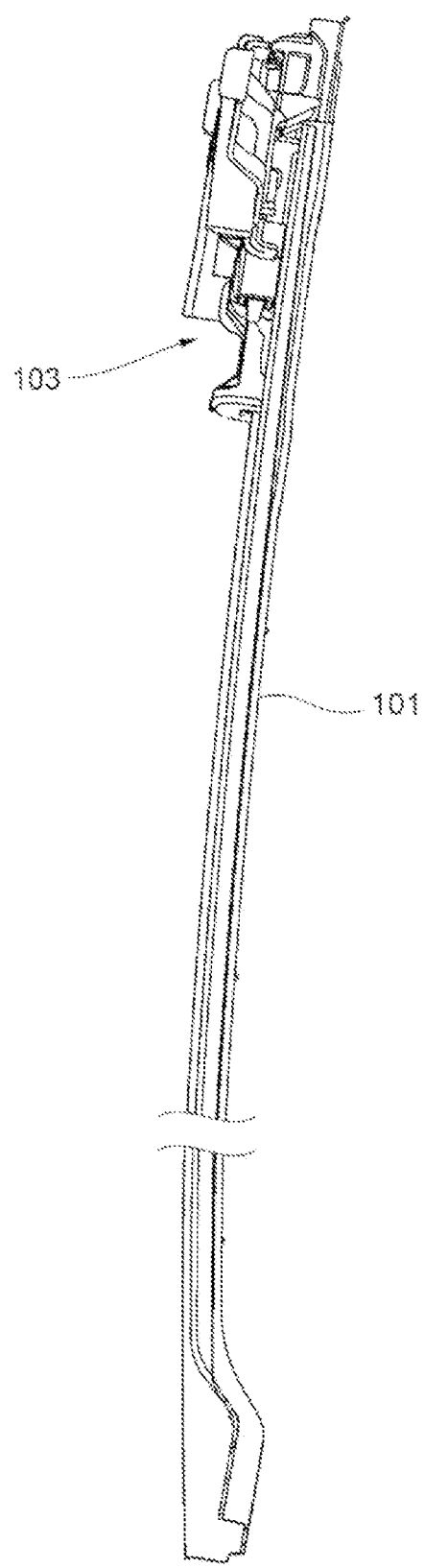
FIG. 6 is a right side view of FIG. 5.
Figure 7:
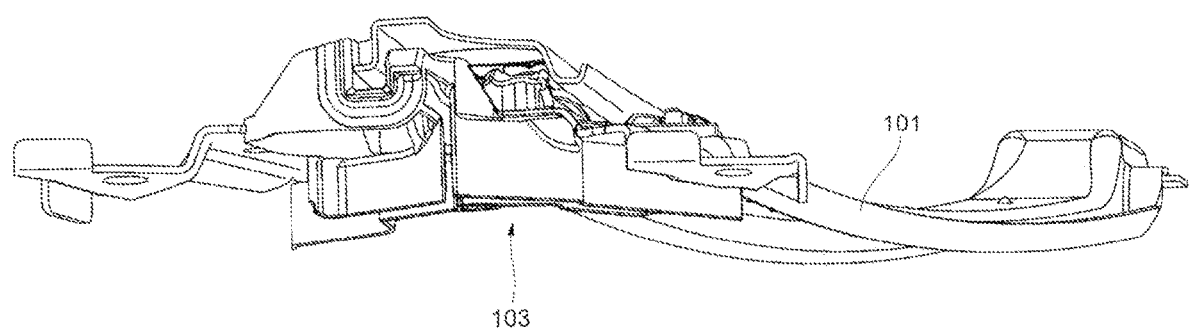
FIG. 7 is an enlarged arrow view seen from a VII direction of FIG. 5.

A wire regulator according to the present embodiment will be described with reference to FIGS. 4 to 7. FIG. 4 is a front view of main parts of the wire regulator according to the embodiment, FIG. 5 is an enlarged view of a state where a glass and a bracket in FIG. 4 are removed, FIG. 6 is a right side view of FIG. 5, and FIG. 7 is an enlarged arrow view seen from a VII direction in FIG. 5.

In these figures, a guide rail 101 is provided to an inner panel of a door along an ascending/descending direction of a window glass 105 (that is a direction that goes along a line segment that intersects a vertical line/a diagonal upper direction or a diagonal lower direction). A slider 103 that holds the window glass 105 with brackets 102 and 104 interposed therebetween movably engages with a front surface side of this guide rail 101 (a face of the guide rail 101 shown in FIGS. 4 and 5).

The slider 103 is engaged with one end part of an ascending wire 131 that extends toward an upper side of the slider 103, and one end part of a descending wire 135 that extends toward a lower side of the slider 103.

An other end part of the ascending wire 131 and an other end part of the descending wire 135 are wound around an unillustrated drum. Furthermore, when the descending wire 135 and the ascending wire 131 wound around the drum are fed from the drum or are wound by rotating or driving the drum, the slider 103 ascends or descends along the guide rail 101.

Figure 1:
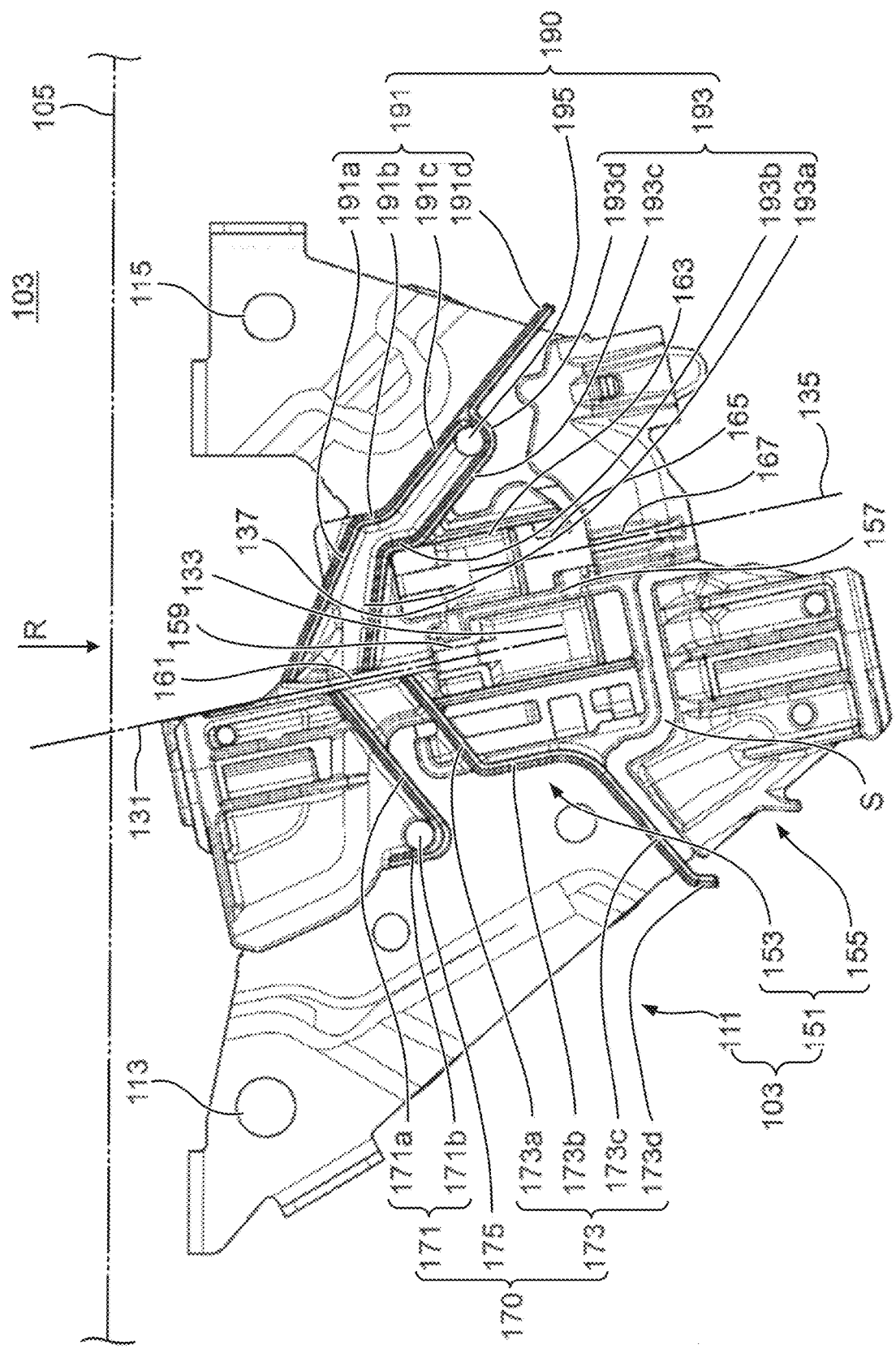
FIG. 1 is an enlarged view of a slider in FIG. 6 that is a front view of a wire regulator.
Figure 2:
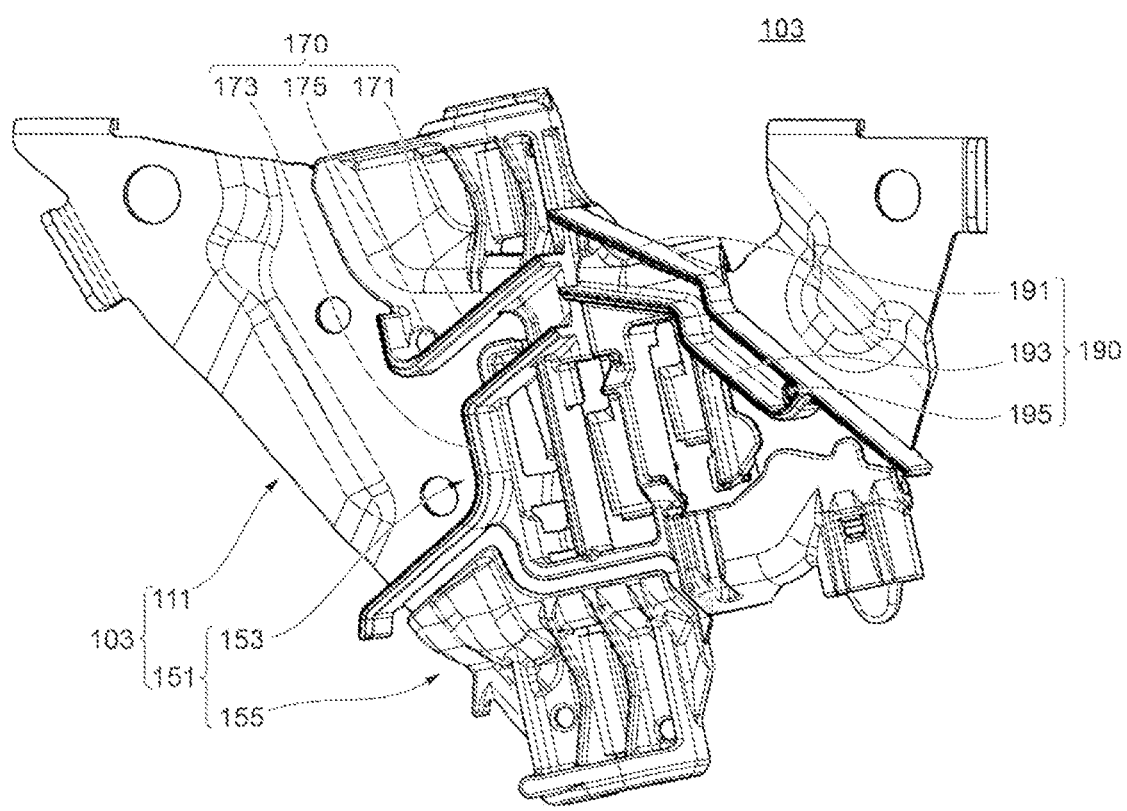
FIG. 2 is a perspective view seen from a right side of FIG. 1.
Figure 3:
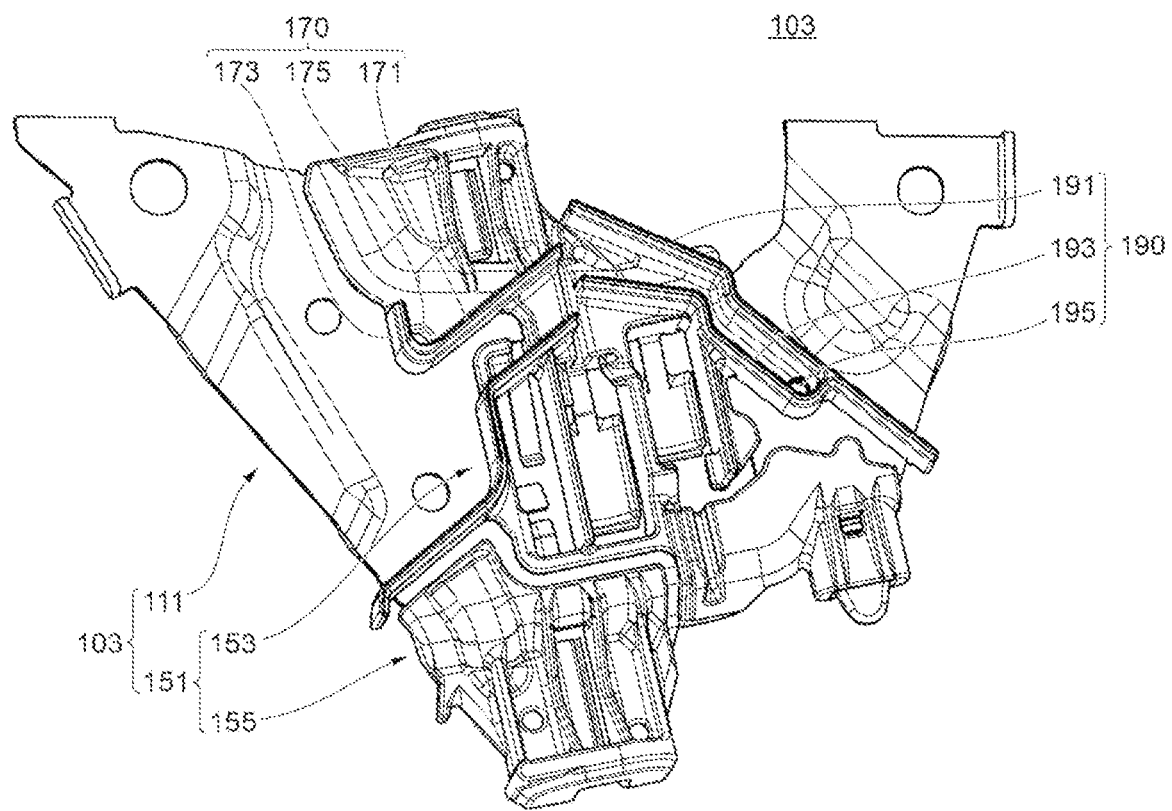
FIG. 3 is a perspective view seen from a left side of FIG. 1.

Next, the slider 103 will be described with reference to FIGS. 1 to 3. FIG. 1 is an enlarged view of the slider in FIG. 4 that is a front view of the wire regulator according to the present embodiment, FIG. 2 is a perspective view seen from a right side of FIG. 1, and FIG. 3 is a perspective view seen from a left side of FIG. 1.

The slider 103 according to the present embodiment is an insert molded article of a resin member and a metal member, and is roughly classified into a metal part 111 of a plate shape, and a resin part 151 that covers part of a front surface F.S. (a face of the metal part 111 shown in FIGS. 1 to 3) and a back surface B.S. (a face of the metal part 111 not shown in FIGS. 1 to 3) of the metal part 111.

The resin part 151 on a side of the front surface F.S. of the metal part 111 is classified into a first resin part 153 that is located at an upper part and a second resin part 155 that is located at a lower part with a slit S interposed therebetween.

Two hole 113 and hole 115 to which the bracket 102 and the bracket 104 are attached are formed in the metal part 111.

An ascending wire end housing part 157 that is provided with a wire end 133 of the ascending wire 131 that extends toward the upper side of the slider 103 is formed in the first resin part 153 of the resin part 151. Unillustrated urging means that urges this wire end 133 urges the ascending wire 131 in a pulling direction. Furthermore, a guide part 159 and a gutter 161 (ascending wire gutter) that continue to the ascending wire end housing part 157 and guide the ascending wire 131 to an upper part of the slider 103 are formed along an identical straight line.

In addition, a drop direction of rain water is indicated by an arrow R in FIG. 1. Furthermore, an extension direction of the guide part 159 and the gutter 161 that guide the ascending wire 131 to the upper part of the slider 103 is a direction that intersects the drop direction of the rain water indicated by the arrow R.

Furthermore, a descending wire end housing part 163 that is provided with a wire end 137 of the descending wire 135 that extends toward a lower side of the slider 103 is formed in the first resin part 153 of the resin part 151. Unillustrated urging means that urges this wire end 137 urges the descending wire 135 in the pulling direction. Furthermore, a guide part 165 and a gutter 167 (descending wire gutter) that continue to the descending wire end housing part 163 and guide the descending wire 135 to a lower part of the slider 103 are formed along an identical straight line. Furthermore, an extension direction of the guide part 165 and the gutter 167 that guide the descending wire 135 to the lower part of the slider 103 is a direction that intersects the drop direction of the rain water indicated by the arrow R.

A first rain water guide part 170 that includes a plurality of eaves (rain gutters) is provided on one side, and a second rain water guide part 190 is provided on an other side with the ascending wire 131 guided to the gutter 161 interposed therebetween.

First, the first rain water guide part 170 including the first eaves 171, the second eaves 173 and the first hole 175 will be described. The first rain water guide part 170 includes the first eaves 171 that are provided at a part above a lower end of the ascending wire end housing part 157 of the slider 103, and accept the rain water that drops from the window glass 105. The first eaves 171 include a main body part 171a that inclines downward in a direction apart from the ascending wire 131, and an end part 171b that extends upward from a lower end of the main body part 171a. The second eaves 173 are formed on a lower side of the first eaves 171. These second eaves 173 include an overlapping part 173a that overlaps the first eaves 171 in the drop direction R of the rain water, a downward extension part 173b that continues to a lower end part of the overlapping part 173a and extends downward, an inclined part 173c that continues to a lower end part of the downward extension part 173b and inclines downward in a direction apart from the ascending wire end housing part 157, and an end part 173d that continues to a lower end of the inclined part 173c and protrudes outward from a rim part of the metal part 111, and whose inclination is steeper than the inclined part 173c. Alternatively, the first hole 175 that penetrates the resin part 151 (first resin part 153) and the metal part 111 is formed at a part surrounded by the main body part 171a and the end part 171b of the first eaves 171.

Furthermore, an upper end part of the main body part 171a of the first eaves 171 and an upper end part of the overlapping part 173a of the second eaves 173 are adjacent to the gutter 161.

Next, the second rain water guide part 190 including 11th eaves 191, 12th eaves 193 and an 11th hole 195 will be described.

The second rain water guide part 190 includes the 11th eaves 191 (corresponding to third eaves in the claims) that accept the rain water dropping from the window glass 105. The 11th eaves 191 include a first main body part 191a at least part of which is provided on an upper side of the first eaves 171 in the drop direction R of the rain water, and that inclines downward in the direction apart from the ascending wire 131, a step part 191b that extends substantially vertically downward from a lower end of the first main body part 191a, a second main body part 191c that inclines downward from a lower end of the step part 191b to a direction apart from the ascending wire 131, and an end part 191d that continues to a lower end of the second main body part 191c and protrudes outward from the rim part of the metal part 111. The 12th eaves (corresponding to fourth eaves in the claims) 193 are formed on a lower side of the 11th eaves 191. The 12th eaves 193 include a first overlapping part 193a at least part of which is provided on an upper side of the second eaves 173 in the drop direction R of the rain water, and that overlaps the first main body part 191a of the 11th eaves 191 in the drop direction R of the rain water, a step part 193b that continues to a lower end part of the first overlapping part 193a and extends substantially vertically downward from a lower end of the first overlapping part 193a, a second overlapping part 193c that continues to a lower end of the step part 193b and overlaps the second main body part 191c of the 11th eaves 191 in the drop direction R of the rain water, and a connection part 193d that extends upward from a lower end of the second overlapping part 193c and is connected with a lower surface of the second main body part 191c of the 11th eaves 191. Alternatively, at a part surrounded by the second main body part 191c of the 11th eaves 191, the second overlapping part 193c of the 12th eaves 193 and the connection part 193d, the 11th hole 195 that penetrates the resin part 151 (first resin part 153) and the metal part 111 is formed.

Furthermore, an upper end part of the first main body part 191a of the 11th eaves 191 and an upper end part of the first overlapping part 193a of the 12th eaves 193 are adjacent to the gutter 161.

This configuration can provide following effects.

(1) The first eaves 171 and the second eaves 173 that overlap the first eaves 171 in the drop direction of the rain water are provided, so that, even when part of the rain water having hit an upper surface of the first eaves 171 goes around to a lower surface of the first eaves 171 due to a surface tension, and drops, the part of the rain water drops on an upper surface of the second eaves 173, and consequently does not enter the ascending wire end housing part 157 or adhere to the ascending wire 131 or the guide rail 101. Consequently, the ascending wire end housing part 157 does not freeze, the ascending wire 131 and the guide rail 101 do not rust, and the wire regulator does not cause an operation failure.

(2) The 12th eaves 193 that overlap the 11th eaves 191 in the drop direction of the rain water are provided, so that, even when part of rain water flowing on an upper surface of the 11th eaves 191 goes around to a lower surface of the 11th eaves 191, and drops, the part of the rain water drops on an upper surface of the 12th eaves 193, and consequently does not enter the ascending wire end housing part 157 or does not adhere to the ascending wire 131 or the guide rail 101. Consequently, the ascending wire end housing part 157 does not freeze, the ascending wire 131 and the guide rail 101 do not rust, and the wire regulator does not cause the operation failure.

(3) Thus, the first rain water guide part 170 and the second rain water guide part 190 have functions of preventing rain water from entering the ascending wire end housing part 157, the descending wire end housing part 163 and the "gutter part". In this regard, the "gutter part" means the gutter 161 (ascending wire gutter) in a narrow sense, and is used as a comprehensive concept of the gutter 161 (ascending wire gutter) and the gutter 167 (descending wire gutter) (a concept that indicates at least one of the gutter 161 and the gutter 167) in a broad sense.

This application claims priority to Japanese Patent Application No. 2020-060546 filed on Mar. 30, 2020, the entire contents of which are incorporated by reference herein.

INDUSTRIAL APPLICABILITY

A wire regulator according to the present embodiment can be applied to, for example, a regulator that opens and closes a window glass of a vehicle.

The invention claimed is:

1. A window regulator that comprises:
   a guide rail that is provided along an ascending/descending direction of a window glass;
   a slider that is attached with the window glass and engages movably with the guide rail;
   an ascending wire that extends toward an upper side of the slider and includes one end engaged with an ascending wire end housing part of the slider;
   a descending wire that extends toward a lower side of the slider and includes one end engaged with a descending wire end housing part of the slider;
   a first rain water guide part provided on one side of the slider above a lower end of the ascending wire end housing part of the slider, the first rain water guide part preventing rain water from entering the ascending wire end housing part, the descending wire end housing part and a gutter part that includes an ascending wire gutter through which the ascending wire is guided and a descending wire gutter through which the descending wire is guided, wherein
   the first rain water guide part includes
   first eaves that accept rain water dropping from the window glass, and
   second eaves that overlap the first eaves on a lower side of the first eaves and in a drop direction of the rain water, and that accept rain water dropping from the first eaves; and
   a second rain water guide part provided on an other side of the slider, with the ascending wire interposed between the first rain water guide part and the second rain water guide part, wherein the second rain water guide part includes third eaves that accept rain water dropping from the window glass, wherein
   at least part of the third eaves is provided on an upper side of the first eaves in the drop direction of the rain water,
   an upper end part of the third eaves is provided adjacent to the ascending wire gutter through which the ascending wire passes,
   fourth eaves are formed on the slider, the fourth eaves overlapping the third eaves in the drop direction of the rain water, and at least part of the fourth eaves being provided on an upper side of the second eaves in the drop direction of the rain water,
   an upper end part of the fourth eaves is provided adjacent to the ascending wire gutter through which the ascending wire passes, and
   the window regulator is configured to move the slider upwardly and downwardly along the guide rail by moving the ascending wire and the descending wire along the guide rail.

2. The window regulator according to claim 1, wherein upper end parts of the first eaves and the second eaves are provided adjacent to the ascending wire gutter through which the ascending wire passes.

* * * * *